UNITED STATES PATENT OFFICE.

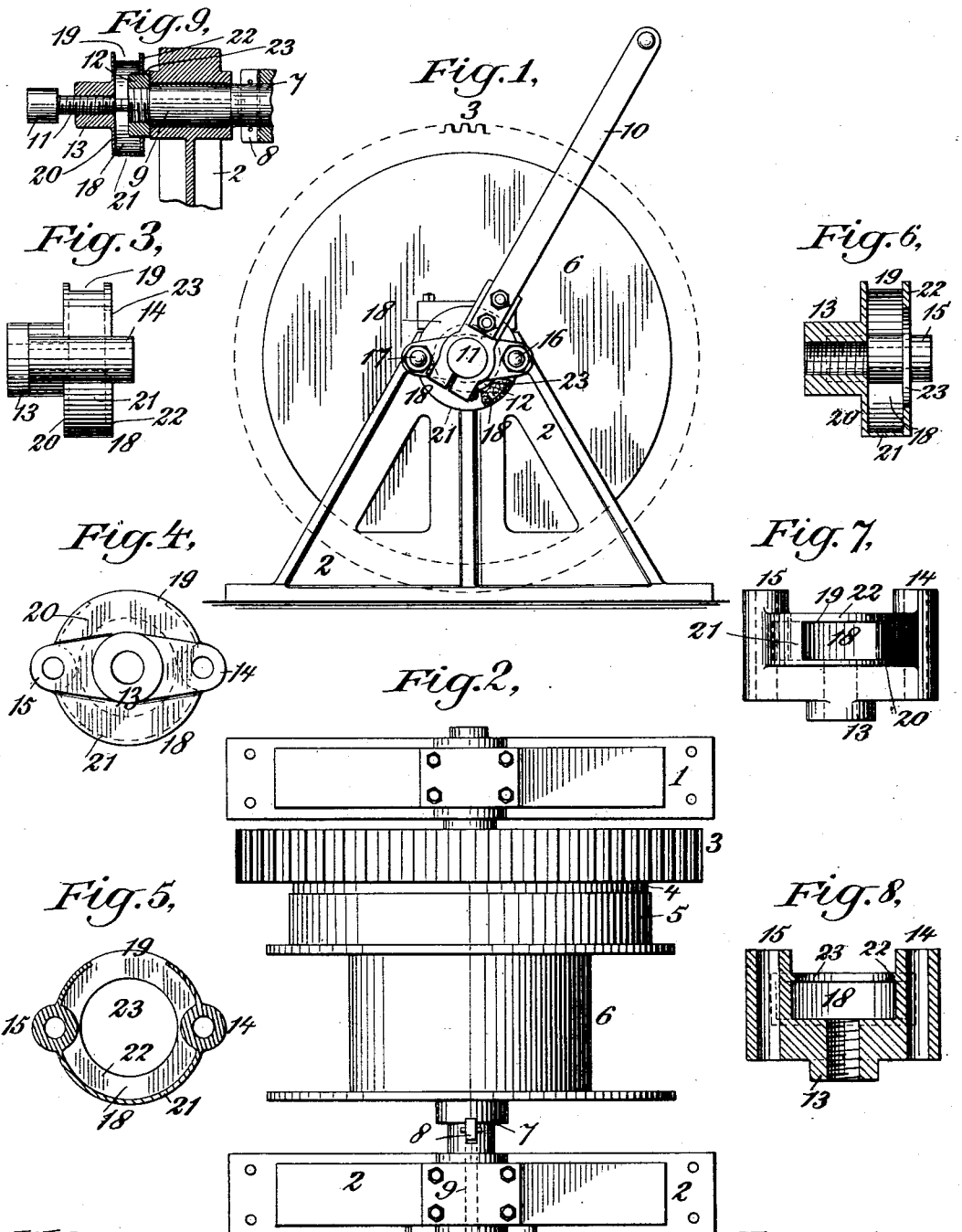

JOHN V. BEEKMAN, OF PLAINFIELD, NEW JERSEY.

FRICTION-DRUM.

SPECIFICATION forming part of Letters Patent No. 541,308, dated June 18, 1895.

Application filed November 2, 1894. Serial No. 527,697. (No model.)

*To all whom it may concern:*

Be it known that I, JOHN V. BEEKMAN, a citizen of the United States, and a resident of Plainfield, in the county of Union and State of New Jersey, have invented certain new and useful Improvements in Friction-Drums, of which the following is a specification.

Figure 1 is an end view of an apparatus containing my invention. Fig. 2 is a plan view of the same. Figs. 3, 4, 5, 6, 7, 8, and 9 are details.

The standards 1, 2, the spur wheel 3, the wooden friction member 4, the metallic friction member 5, the drum 6, the shaft 7, the cross key 8, the pin 9, the lever 10 and the screw 11 are all of ordinary form. The point of the screw 11 is made of steel, also the pin 9 and the cross key 8.

12 is a collar screwed upon the end of the shaft 7.

13 is a nut into which the screw 11 is screw-threaded and which contains projections 14, 15 spanning the collar 12. Bolts 16 and 17 secure these projections to the standard 2.

A box 18 containing an opening 19 at the top incloses the space around the point of contact between the point of the screw 11 and the pin 9. This box is composed of the following parts preferably all cast in one piece with the nut 13, viz: the disk 20, the ring 21 containing the top opening 19, and the disk 22 which is made annular so that the edges at the periphery of the opening 23 accurately fit around the collar 12.

By turning the screw 11, the pin 9 and cross key 8 are forced forward and force the drum toward the spur wheel so as to make contact between the friction surfaces. By turning the screw 11 in the opposite direction, the friction surfaces are released.

By filling the box 18 through the top opening with a lubricant, preferably in the form of waste soaked with a heavy oil or grease, the contact between the point of the screw 11 and the pin 9 will be constantly lubricated.

The immense power required to be exerted by the point of the screw 11 upon the pin 9 causes a friction between those parts which has heretofore been productive of great wear and tear, but by my improvement this difficulty is substantially remedied.

I claim—

1. In a rope drum apparatus, in combination, the shaft, the driving member fixed thereon, the rope drum movable thereon, the friction members interposed between the driving member and the rope drum, the pin 9 within said shaft, the cross key 8 interposed between said pin and the rope drum, the standard 2 located vertically under the bearing of said shaft and constituting an independent support therefor, the screw 11 bearing against said pin, the nut 13, and means whereby the same is secured to said standard on opposite sides of the end of the shaft, and a box 18 inclosing the space around the point of contact between the point of the screw and the pin, substantially as described.

2. In a rope drum apparatus, in combination, the shaft, the driving member fixed thereon, the rope drum movable thereon, the friction members interposed between the driving member and the rope drum, the pin 9 within said shaft, the cross key 8 interposed between said pin and the rope drum, the standard 2 located vertically under the bearing of said shaft and constituting an independent support therefor, the screw 11 bearing against said pin, the nut 13, the collar 12 secured to the end of the shaft projecting beyond its bearings and the box 18 fixed to said nut 13 and fitting loosely around said collar, substantially as described.

3. In a rope drum apparatus, in combination, the shaft, the driving member fixed thereon, the rope drum movable thereon, the friction members interposed between the driving member and the rope drum, the pin 9 within said shaft, the cross key 8 interposed between said pin and the rope drum, the standard 2 located vertically under the bearing of said shaft and constituting an independent support therefor, the screw 11 bearing against said pin, the nut 13 and a box connected with said nut consisting of the disk 20, the ring 21 containing a top opening and the annular disk 22 adapted to fit around the shaft mechanism, substantially as described.

JOHN V. BEEKMAN.

Witnesses:
 J. E. GREER,
 M. WILSON.